(12) United States Patent
Moore

(10) Patent No.: US 11,299,040 B2
(45) Date of Patent: Apr. 12, 2022

(54) LOW-PROFILE LIQUID STORAGE TANK AND GROUNDS MAINTENANCE VEHICLE INCORPORATING SAME

(71) Applicant: EXMARK MANUFACTURING COMPANY, INCORPORATED, Beatrice, NE (US)

(72) Inventor: Nickolas T. Moore, Beatrice, NE (US)

(73) Assignee: Exmark Manufacturing Company, Incorporated, Beatrice, NE (US)

( * ) Notice: Subject to any disclaimer, the term of this patent is extended or adjusted under 35 U.S.C. 154(b) by 185 days.

(21) Appl. No.: 16/295,107

(22) Filed: Mar. 7, 2019

(65) Prior Publication Data
US 2020/0282826 A1 Sep. 10, 2020

(51) Int. Cl.
*B60K 15/073* (2006.01)
*B60K 15/03* (2006.01)
*B60K 15/04* (2006.01)

(52) U.S. Cl.
CPC ...... *B60K 15/073* (2013.01); *B60K 15/03006* (2013.01); *B60K 15/03177* (2013.01); *B60K 15/04* (2013.01); *B60K 2015/03493* (2013.01); *B60Y 2200/223* (2013.01)

(58) Field of Classification Search
CPC .............. A01D 2101/00; B60K 15/073; B60K 15/03006; B60K 15/03177; B60K 15/04; B60K 2015/03493; B60K 15/077; B60K 2015/0777; B60Y 2200/223; F17C 2201/01; F17C 2203/012
See application file for complete search history.

(56) References Cited

U.S. PATENT DOCUMENTS

| | | | | |
|---|---|---|---|---|
| 3,552,596 A | * | 1/1971 | Landon | B60K 15/03 220/564 |
| 3,881,457 A | * | 5/1975 | Benner | B60K 15/077 123/434 |
| 4,453,564 A | * | 6/1984 | Bergesio | B29C 66/1312 137/574 |
| 4,526,286 A | * | 7/1985 | Jung | B60K 15/03177 220/4.14 |
| 4,708,170 A | * | 11/1987 | Bailey | B60K 15/077 137/574 |

(Continued)

FOREIGN PATENT DOCUMENTS

WO  WO 2017214467 A1  12/2017

OTHER PUBLICATIONS

U.S. Appl. No. 16/403,434, filed May 3, 2019, Exmark Manf. Co., Inc.

(Continued)

*Primary Examiner* — Tony H Winner
*Assistant Examiner* — Michael R Stabley
(74) *Attorney, Agent, or Firm* — Mueting Raasch Group

(57) ABSTRACT

A low-profile liquid storage tank and vehicles incorporating same. An exemplary low-profile liquid storage tank may define an interior volume having an upper surface that defines an access port, and a lower surface that includes a fluid impingement portion positioned below the access port. The impingement portion may include two or more undulations formed in or on the lower surface of the tank, the undulations adapted to assist with reducing splash-back of fluid added to the tank through the access port.

15 Claims, 9 Drawing Sheets

(56) References Cited

U.S. PATENT DOCUMENTS

| | | | | |
|---|---|---|---|---|
| 5,127,432 | A * | 7/1992 | Duhaime | B60K 15/077 137/574 |
| 5,258,159 | A * | 11/1993 | Freeman | B29C 70/086 264/258 |
| 5,344,038 | A * | 9/1994 | Freeman | B29C 33/0016 220/562 |
| 5,398,839 | A * | 3/1995 | Kleyn | B60K 15/03177 220/4.14 |
| 6,896,293 | B2 | 5/2005 | Philipps et al. | |
| 8,047,310 | B2 | 11/2011 | Kallevig | |
| 8,813,780 | B2 * | 8/2014 | Scheffler | B60K 15/03519 137/587 |
| 8,840,976 | B2 * | 9/2014 | Larson | C08G 18/56 428/35.7 |
| 9,278,616 | B2 * | 3/2016 | Kopiec | B60K 15/03 |
| 9,446,661 | B2 * | 9/2016 | Kawano | B60K 15/03006 |
| 9,676,274 | B2 * | 6/2017 | Pearce | B60K 15/03177 |
| 10,023,322 | B2 * | 7/2018 | Keefer | B65D 39/084 |
| 10,729,073 | B2 | 8/2020 | Bryant et al. | |
| 2004/0168654 | A1 * | 9/2004 | Radtke | F02B 63/04 123/2 |
| 2006/0151505 | A1 * | 7/2006 | Kobayashi | B29C 45/14262 220/562 |
| 2017/0196164 | A1 | 7/2017 | Bryant et al. | |
| 2019/0357429 | A1 | 11/2019 | Andre et al. | |
| 2020/0080501 | A1 | 3/2020 | Andre et al. | |

OTHER PUBLICATIONS

U.S. Appl. No. 16/403,436, filed May 3, 2019, Exmark Manf. Co., Inc.

U.S. Appl. No. 16/402,938, filed May 3, 2019, Exmark Manf. Co., Inc.

U.S. Appl. No. 16/402,963, filed May 3, 2019, Exmark Manf. Co., Inc.

* cited by examiner

LOW-PROFILE LIQUID STORAGE TANK AND GROUNDS MAINTENANCE VEHICLE INCORPORATING SAME

Embodiments of the present disclosure are directed to grounds maintenance vehicles such as lawn mowers and, more particularly, to such vehicles incorporating a low-profile liquid (e.g., fuel) storage tank.

BACKGROUND

Grounds maintenance vehicles such as lawn mowers and the like are used by homeowners and professionals alike to care for turf and other ground surfaces. These vehicles typically include a prime mover (e.g., internal combustion engine) to power not only an implement (e.g., grass cutting deck) attached to the vehicle, but also a traction drive system, the latter adapted to propel the vehicle over the ground surface.

Generally speaking, mowers and other grounds maintenance vehicles are configured as either ride-on or walk-behind machines. Moreover, ride-on vehicles may be adapted to support either a sitting (sit-on") or standing ("stand-on") operator.

Regardless of the vehicle configuration, a source of fuel typically is carried by the vehicle via one or more onboard liquid fuel storage tanks. For landscape professionals, it is desirable to provide a tank of sufficient size to permit operation of the vehicle for extended periods of time. Yet available space to accommodate the tanks is often limited, especially with compact vehicles such as stand-on mowers.

To address this issue, some manufacturers have located the tanks on the transverse sides of the vehicle. For example, some mowers may design the tanks into fenders associated with the drive wheels of the vehicle. While effective at utilizing available on-board space, large capacity side and fender tanks may result in a tank height that is aesthetically undesirable, especially when the tank is located over the drive wheel. Alternatively, decreasing the height of the tank located over the wheel may result in a shallow tank that is more difficult to fill.

SUMMARY

Embodiments described herein may, in one embodiment, include a low-profile storage tank defining an interior volume adapted to store liquid carried by a grounds maintenance vehicle. The tank includes: an interior upper surface defining an access port into the interior volume; and an interior lower surface having a fluid impingement portion positioned below the access port, the impingement portion including two or more undulations formed in or on the lower surface of the tank.

In another embodiment, a grounds maintenance vehicle is provided that includes a frame and a low-profile liquid storage tank attached to the frame, the tank defining an interior volume. The tank includes: an interior upper surface defining an access port into the interior volume; and an interior lower surface having a fluid impingement portion positioned vertically below the access port. The impingement portion includes two or more undulations formed in or on the lower surface of the tank.

In still another embodiment, a grounds maintenance vehicle is provided that includes a frame and a low-profile liquid storage tank attached to the frame, the tank defining an interior volume. The tank includes: an interior upper surface defining an access port into the interior volume, the access port defining an axis; and an interior lower surface having a fluid impingement portion, wherein the axis of the access port intersects the fluid impingement portion at an angle of 30-90 degrees. The impingement portion may include two or more undulations formed in or on the lower surface of the tank.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
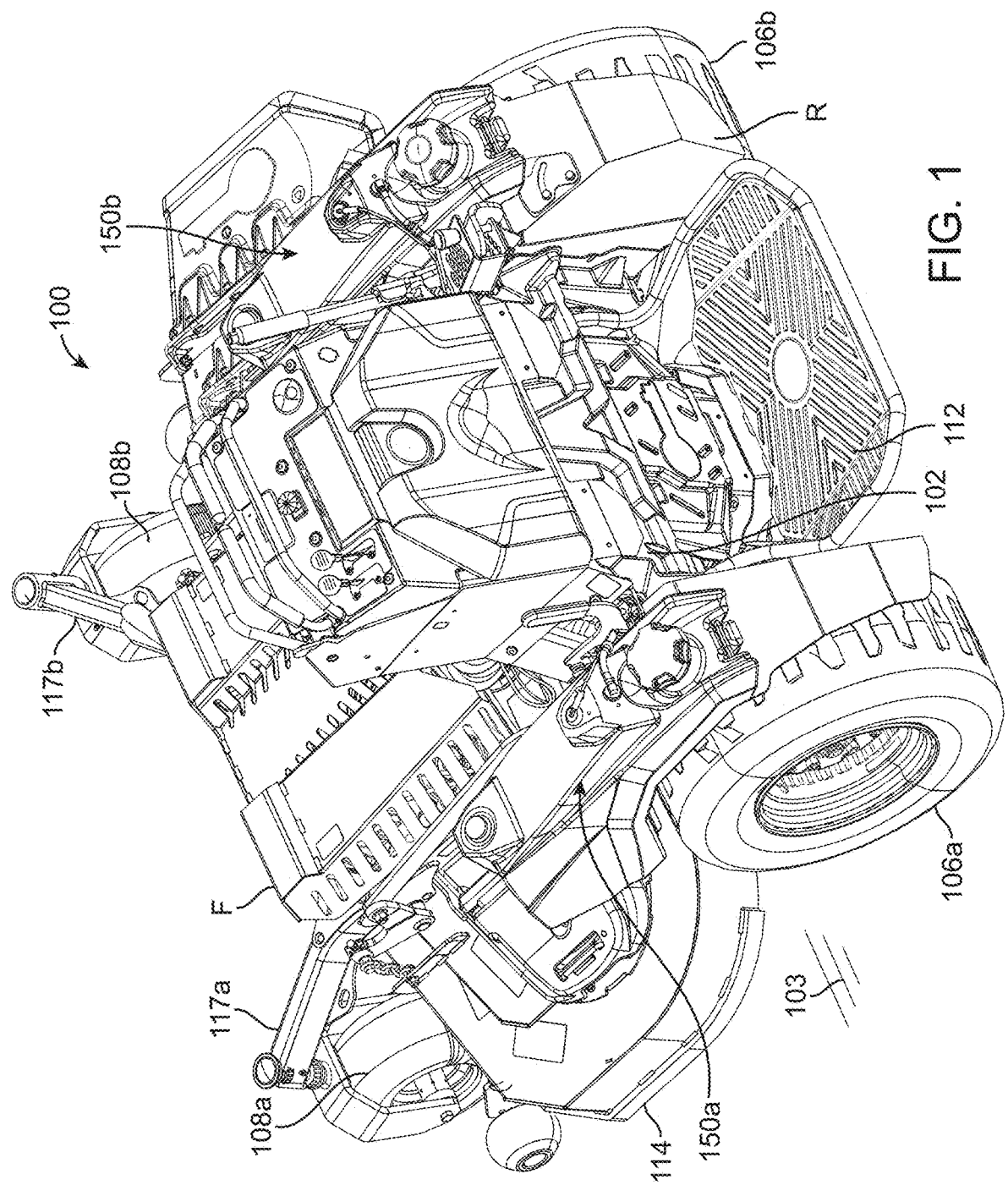
FIG. 1 is a left rear perspective view of a self-propelled grounds maintenance vehicle, e.g., stand-on lawn mower, incorporating a low-profile liquid storage (e.g., fuel) tank in accordance with embodiments of the present disclosure.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of exemplary embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified by the term "about."

Embodiments of the present disclosure are directed to powered grounds maintenance vehicles, and to low-profile liquid storage tanks for use with the same. For example, embodiments of the present disclosure may provide a grounds maintenance vehicle having a low-profile liquid fuel tank including an interior upper surface defining an access port into an interior volume, and an interior lower surface including a fluid impingement portion positioned below the access port, wherein the impingement portion includes two or more undulations. In the illustrated embodiments, the two or more undulations are depicted as being formed by ribs. However, such a construction is exemplary only as embodiments wherein the undulations take on other shapes (e.g., saw-tooth peaks, concave depressions, serpentine wave, dimples, pyramids, diamonds, cones, etc.) are contemplated. Accordingly, as used herein, "undulation" refers to any element that causes the effective surface to deviate from a plane (or from a smooth continuous curve). Accordingly, undulations formed on a lower surface of the tank may be of most any configuration that effectively forms a surface offset from adjacent portions of the lower surface. Such undulations are adapted to disperse liquid fuel as the fuel is poured into the low-profile tank, thereby reducing the likelihood that liquid will splash back out of the access port.

While embodiments are described herein as a fuel storage tank, those of skill in the art will recognize that embodiments of the present disclosure may find application to most any liquid storage tank without departing from scope of the present disclosure. While by no means a complete list, embodiments of the present disclosure may find application to liquid fertilizer tanks, water tanks, and the like.

With reference to the figures of the drawing, wherein like reference numerals designate like parts and assemblies throughout the several views, FIG. 1 illustrates a low-profile liquid fuel tank 150 (left side tank 150a and right side tank 150b) in accordance with embodiments of the present disclosure, the tanks shown mounted on a self-propelled grounds maintenance vehicle, e.g., a stand-on riding lawn mower 100. While, for the sake of brevity, embodiments of the disclosure are described in the context of a stand-on mower (hereinafter generically referred to simply as a "vehicle" or "mower"), those of skill in the art will realize that embodiments are also applicable to other types of ride-on, walk-behind, and ride-behind mowers (e.g., those utilizing sulkies), as well as to almost any other grounds maintenance vehicle. Such vehicles may include, for example, skid-steer loaders, aerators, material spreaders and sprayers, snow throwers, tillers, debris blowers, debris vacuums, etc.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that ground engaging members (e.g., wheels 106 and 108) rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While not necessarily central to an understanding of exemplary embodiments of the present disclosure (e.g., other mower and other vehicle configurations are certainly contemplated), the general construction of the exemplary mower 100 is briefly described below with reference to FIG. 1. As shown in this view, the mower 100 may include a chassis or frame 102 having a front end F and a rear end R, the frame 102 supporting a power source or prime mover, e.g., internal combustion engine. A pair of transversely opposing, ground engaging drive members, e.g., first and second (left and right) rear drive wheels 106a and 106b, may be coupled to opposite (left and right) rear sides of the chassis to support the mower upon, and propel the mower 100 relative to, the ground surface 103. Each drive wheel 106 may be powered by its own hydraulic motor (not shown) that receives power from, at least in one embodiment, its own hydrostatic pump (also not shown). The pumps may be supported by the frame 102 and powered by the engine.

Operator controls, permit independent control of the speed and direction of each drive wheel 106, allowing operator control of mower 100 speed and direction from a walking or riding (e.g., standing) position generally behind the mower 100. A pair of front ground engaging members (e.g., left and right caster wheels 108a, 108b), which may be connected to forwardly extending frame rails 117 (117a and 117b), may support the front of the mower 100 in rolling engagement with the ground surface 103.

Although the illustrated mower 100 has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration or a vehicle having conventionally-steered wheels. These and other embodiments are certainly possible without departing from the scope of the present disclosure. Moreover, while illustrated herein as wheels, other ground engaging members (e.g., tracks, skids, rollers, etc.) are also contemplated.

An implement, e.g., cutting deck 114, may be connected to a lower side of the frame 102 (generally longitudinally between the drive wheels 106 and the caster wheels 108). The cutting deck 114 may include one or more cutting blades (not shown) as known in the art. The cutting blades may be operatively powered, via spindles connected to the deck, by the engine via an implement drive system (not shown). During operation, power is selectively delivered to the cutting deck 114, whereby the blades rotate at a speed sufficient to sever grass and other vegetation as the cutting deck passes over the ground surface 103. As indicated above, other grounds maintenance vehicles may locate the implement at other locations on or along the frame (e.g., a forwardly-mounted or "out-front" deck configuration, towed, etc.). Again, while described herein as a cutting deck, other implements (e.g., snow thrower, aerator, etc.) are also contemplated. For addition information regarding exemplary implement and vehicle drive systems, see U.S. patent application Ser. No. 15/803,979.

The exemplary mower 100 may further include a platform 112 attached to the frame 102 at or near the rear end R. The platform may be moved between a deployed position as shown in FIG. 1, and a stowed position (not shown, but similar to the position of the platform 120 shown in FIG. 2 of U.S. Pat. No. 8,047,310). In the deployed position, an operator may stand upon the platform 112 during vehicle operation. Alternatively, the platform may be moved to the stowed position to accommodate the operator in a walk-behind position.

Figure 2:
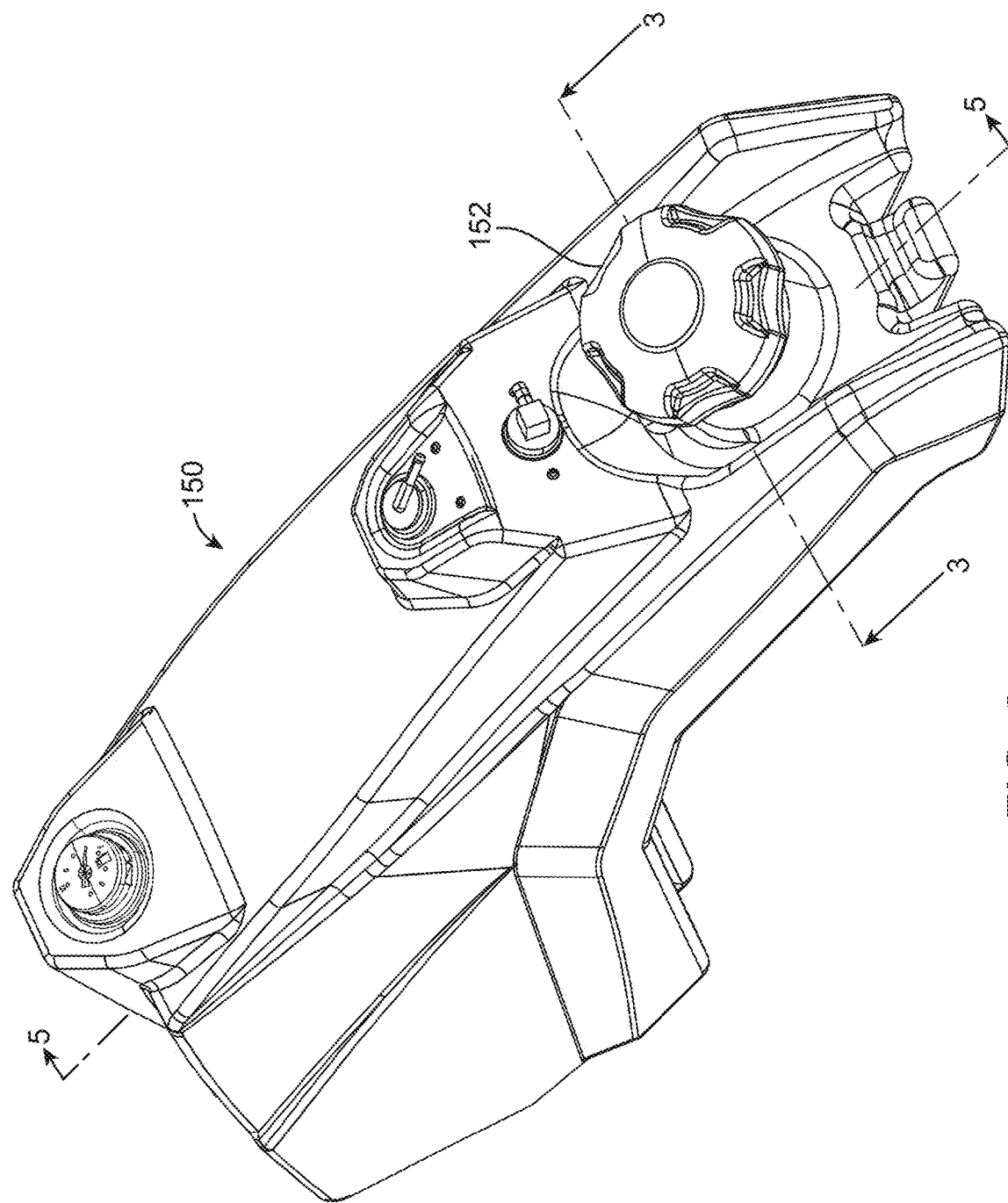
FIG. 2 is a perspective view of one (e.g., left-sided) tank of the mower of FIG. 1 in accordance with embodiments of the present disclosure, the tank shown isolated from the mower.

As illustrated in FIGS. 1 and 2, the mower 100 may further include a low-profile liquid fuel tank 150. In the illustrated embodiment, the mower 100 includes both a left tank 150a and right tank 150b. As these tanks may generally be mirror images of one another, only one tank (e.g., the left tank 150a) will be described herein and referred to generically with reference numeral 150, with the understanding that the description applies equally to the other tank (e.g., to the right tank 150b). While the mower 100 is illustrated with a dual tank fuel system, embodiments of the present disclosure are equally applicable to single tank configurations, as well as to systems utilizing three or more tanks. Moreover, while the exemplary tank 150 is described and illustrated herein with some degree of specificity, those of skill in the art will realize that embodiments of the present disclosure may find application to tanks of most any size, shape, and access port configuration.

In the illustrated embodiment, the tank 150 may include a fuel cap 152 adapted to selectively seal an access port 154 (see FIG. 3), the latter providing access to an interior volume 160 (see FIGS. 3 and 4) defined by the tank. As shown in FIG. 1, the tank 150 may be attached to the frame 102 and, in some embodiments, positioned at least partially over and/or adjacent to one of the drive wheels 106. The tank 150 (e.g., an interior volume thereof) may be in fluid communication with the engine to provide liquid fuel to the latter. The fuel cap 152 may cover the access port 154 when secured to the tank 150, effectively sealing the access port. The fuel cap 152 may be removed as needed to permit fuel to be poured through the access port 154 and into the interior volume 160. While shown as using a fuel cap 152, other tanks may utilize a "capless" design without departing from the scope of this disclosure. The tank 150 may be formed using any suitable process, e.g., injection molding or roto-molding. Moreover, the tank 150 may be constructed of most any suitable material, e.g., plastic, metal, composite, etc.

Figure 3:
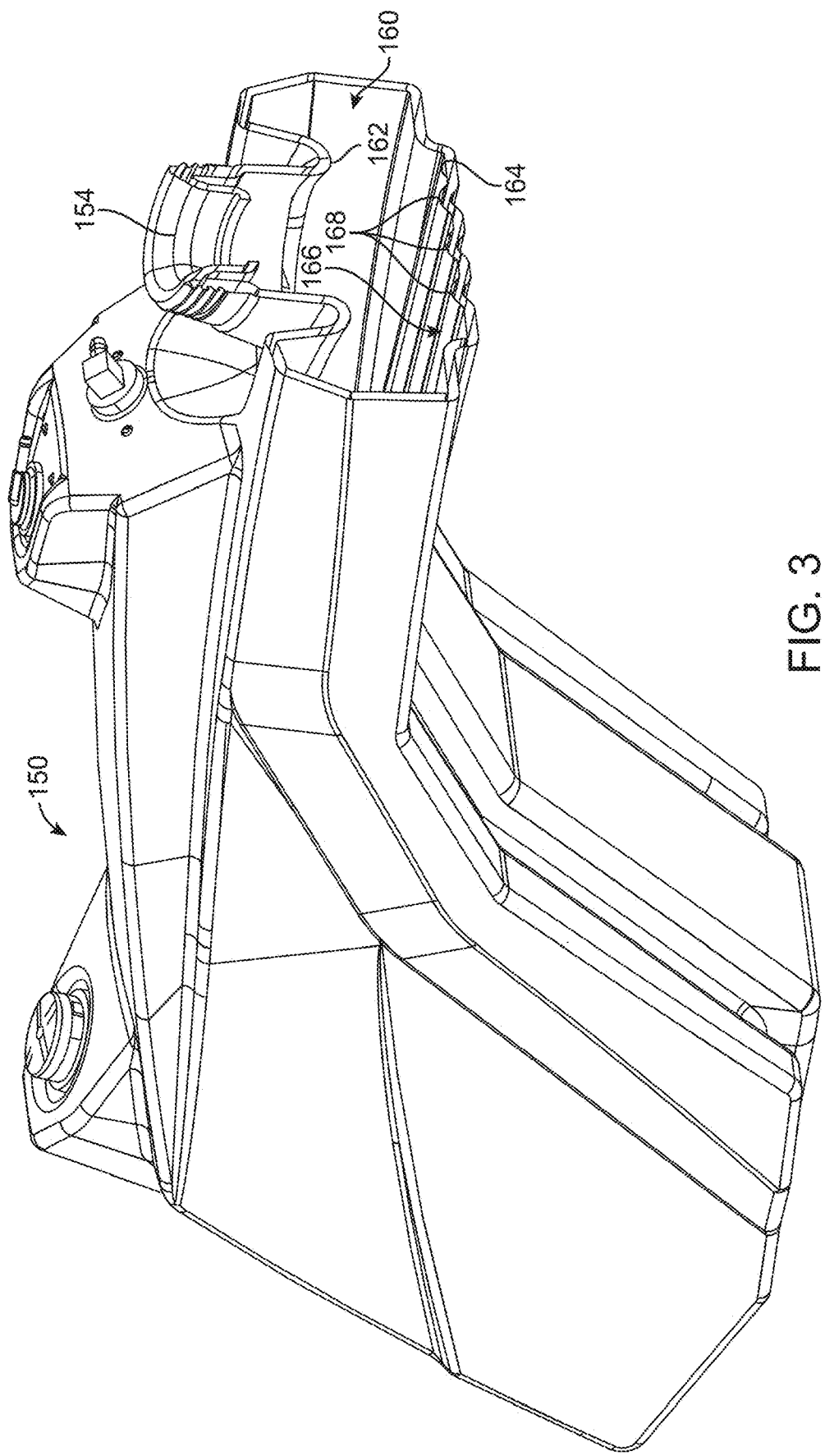
FIG. 3 is a perspective cross-sectional view taken along line 3-3 of FIG. 2.
Figure 4:
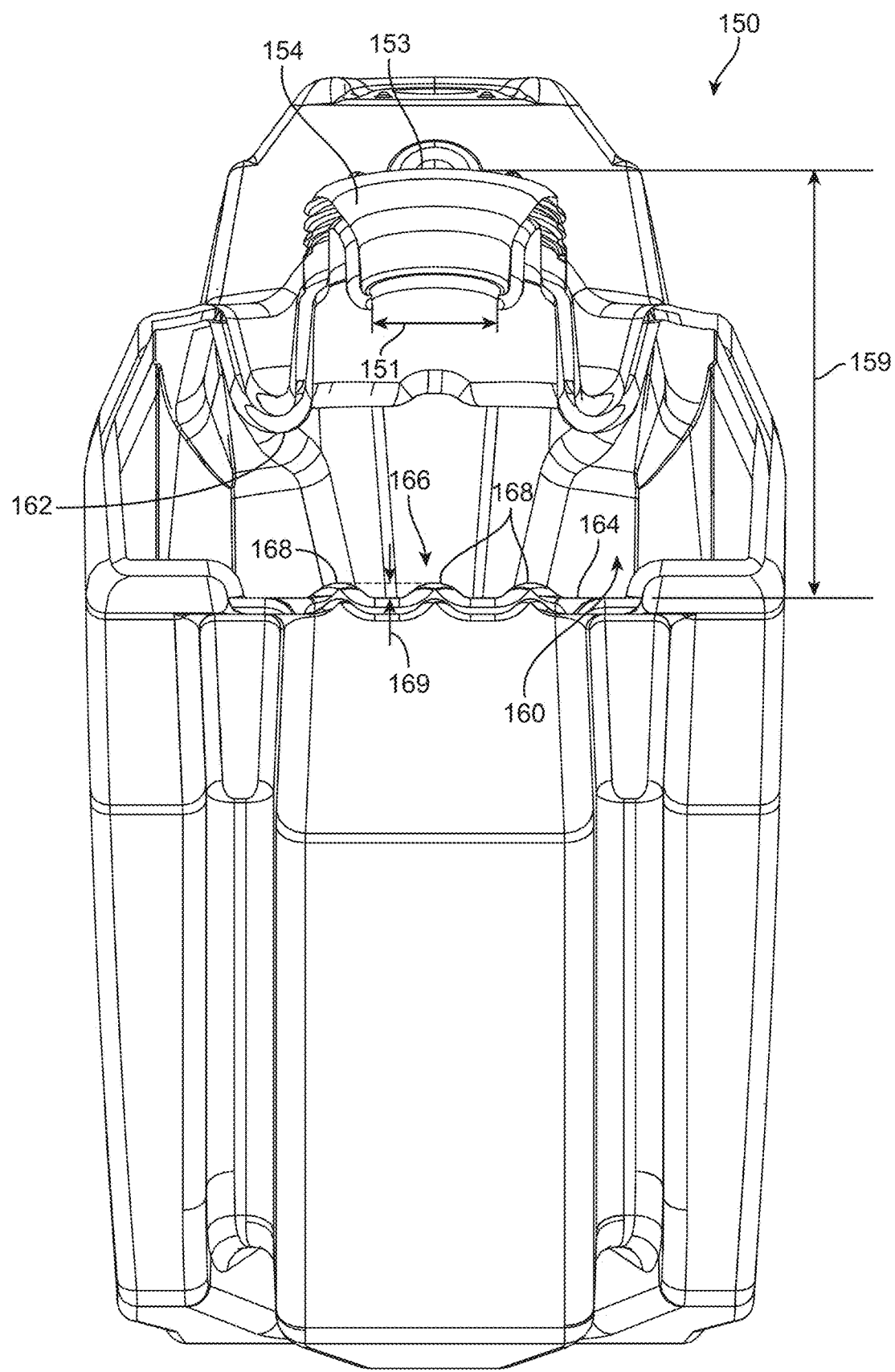
FIG. 4 is a rear view of the cross-section of FIG. 3.
Figure 5:
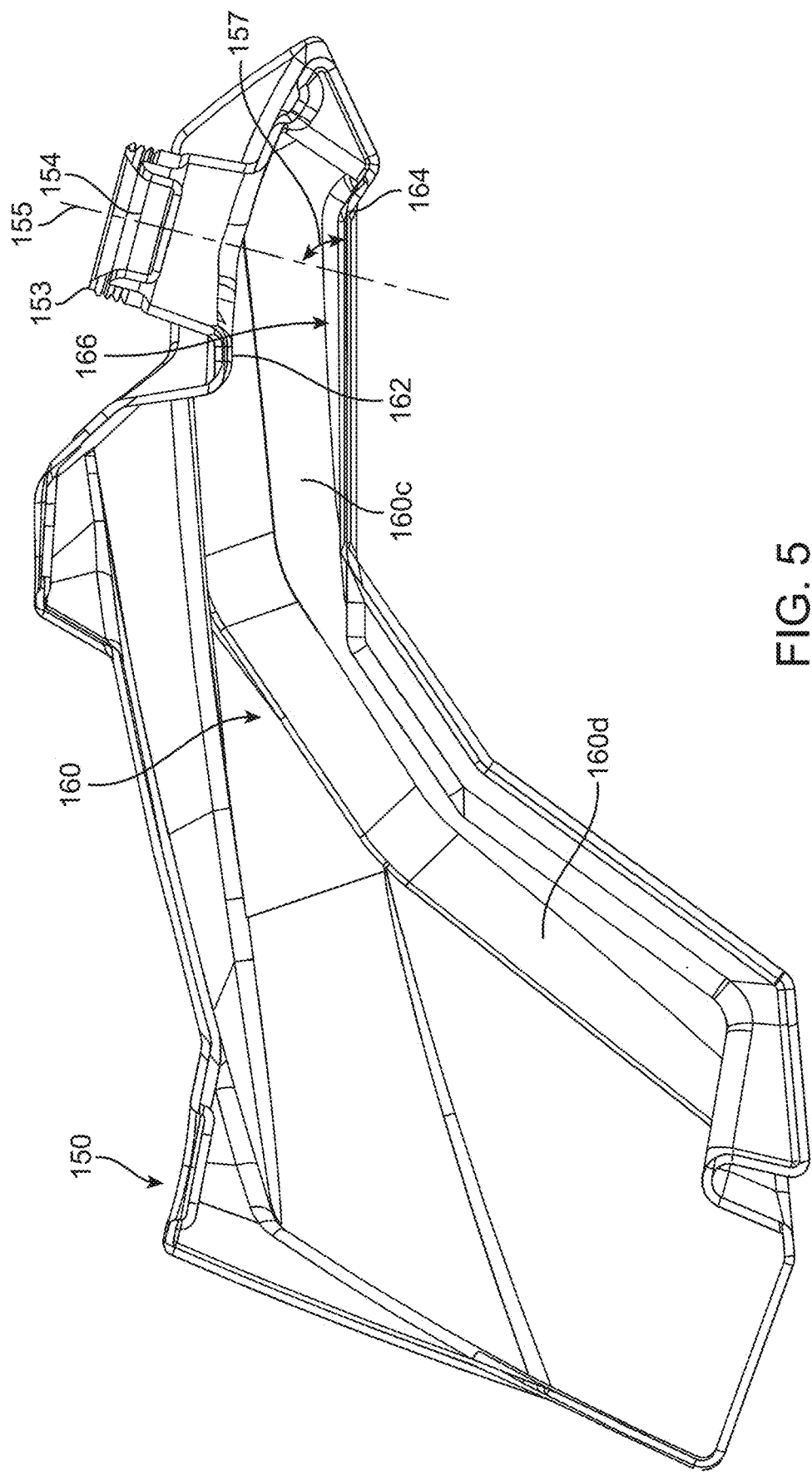
FIG. 5 is a cross-sectional view taken along line 5-5 of FIG. 2.

As illustrated in FIGS. 3-5, the tank 150 (e.g., the interior volume 160) forms an interior upper surface 162 and an interior lower surface 164. The access port 154 may penetrate the upper surface 162 as shown. In some embodiments, the access port 154 may define an effective diameter of 40-60 millimeters (mm).

As also shown in FIGS. 3-5, the lower surface 164 may include a fluid impingement portion 166. In some embodiments, the access port 154 may define an axis 155 that intersects the fluid impingement portion 166 at an angle 157 of 30-90 degrees, e.g., 75 degrees, as shown. That is to say, the impingement portion 166 may be positioned below (e.g., vertically below) the access port 154 so that fluid entering the access port impinges upon the fluid impingement portion. Such contact may redirect the incoming fluid, thereby reducing the chances of fuel splashing back out through the access port. Such benefit may be realized without necessitating a reduction in the rate at which liquid is added to the tank (the "fill rate"). Stated another way, for a given tank fill rate, tanks constructed in accordance with embodiments of the present disclosure may reduce potential fuel splash-back through the access port (when compared to tanks that lack a fluid impingement portion).

In the illustrated embodiments, the impingement portion 166 may include two or more (e.g., three) elongate undulations 168 extending along, and protruding from, the lower surface. These undulations 168 may be any suitable size or shape that assists with the desired deflecting of liquid fuel entering the tank through the access port. In the illustrated embodiments, the undulations 168 may have a maximum offset 169 from adjacent portions of the lower surface 164 of 7 mm or less, e.g., 3 mm-7 mm. Such offset may be selected based upon various factors. For example, shallowness of the tank in the vicinity of the access port may influence the size and shape of the undulations, as may the size (effective diameter) of the access port 154 and the angle 157 (see FIG. 5) of the axis of the access port relative to the impingement portion 166. In the embodiment illustrated in FIG. 4, the access port 154 may have an effective diameter 151 of 40 mm and define an external rim 153, wherein a distance 159 measured from a most distal point on the external rim orthogonal to the lower surface 164 is 150 millimeters or less. With these dimensions, an offset 169 of 5 mm was determined to provide desirable anti-splash characteristics. Of course, undulations having much greater offsets (e.g., 7-50 or more millimeters) may also provide desirable characteristics. However, such configurations may undesirably increase manufacturing cost and decrease overall storage volume.

Figure 9:
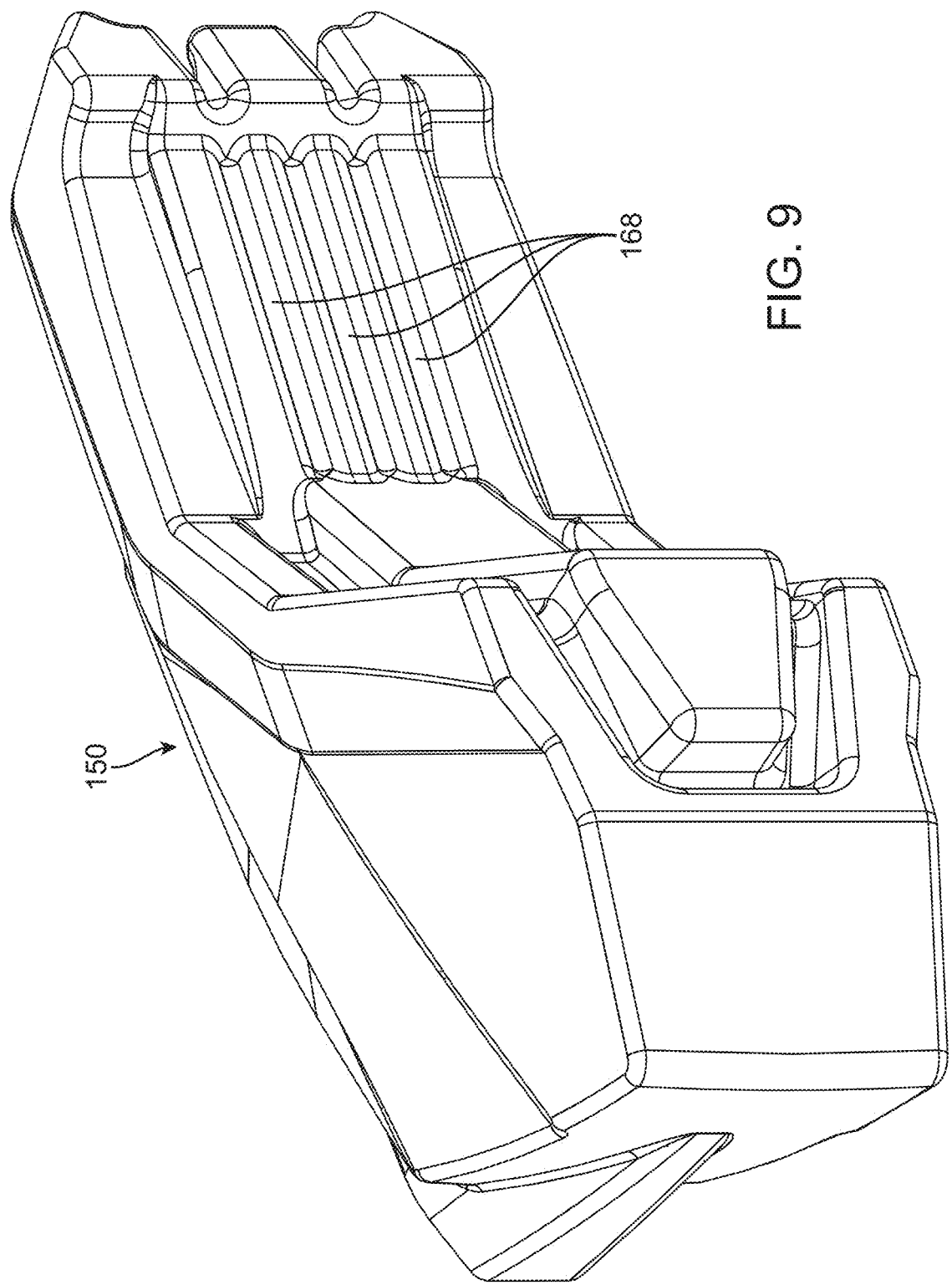
FIG. 9 is a bottom perspective view of the tank of FIG. 2.

As illustrated, the undulations 168 may be ribs that protrude upwardly from adjacent portions of the lower surface 164 toward the access port, and each rib may present a convex surface toward the access port 154. The ribs may further be evenly spaced and parallel to one another and extend in any suitable direction (e.g., along a length of tank 150). Alternatively, the ribs may be of different sizes and shapes and/or randomly positioned. In the illustrated embodiments, the undulations 168 are integrally formed (e.g., molded) with the lower surface 164 as is evident in the bottom view of FIG. 9. However, embodiments in which the undulations are separate components attached to a relatively flat or smoothly curved lower surface are also contemplated.

Figure 6:
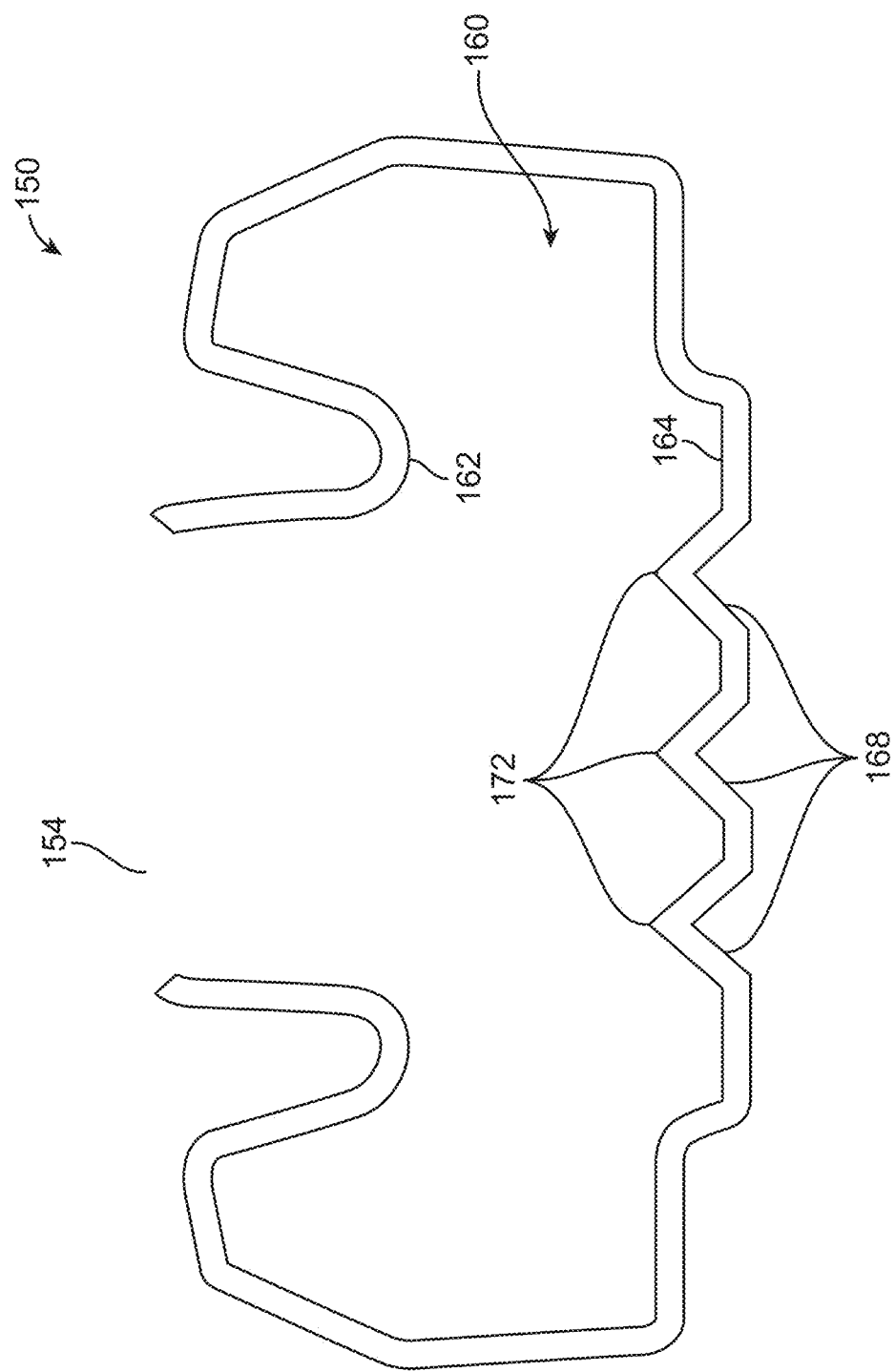
FIG. 6 is a diagrammatic rear cross-sectional view of a tank in accordance with embodiments of the present disclosure, the tank incorporating undulations having a saw-tooth or peak cross-sectional profile.
Figure 7:
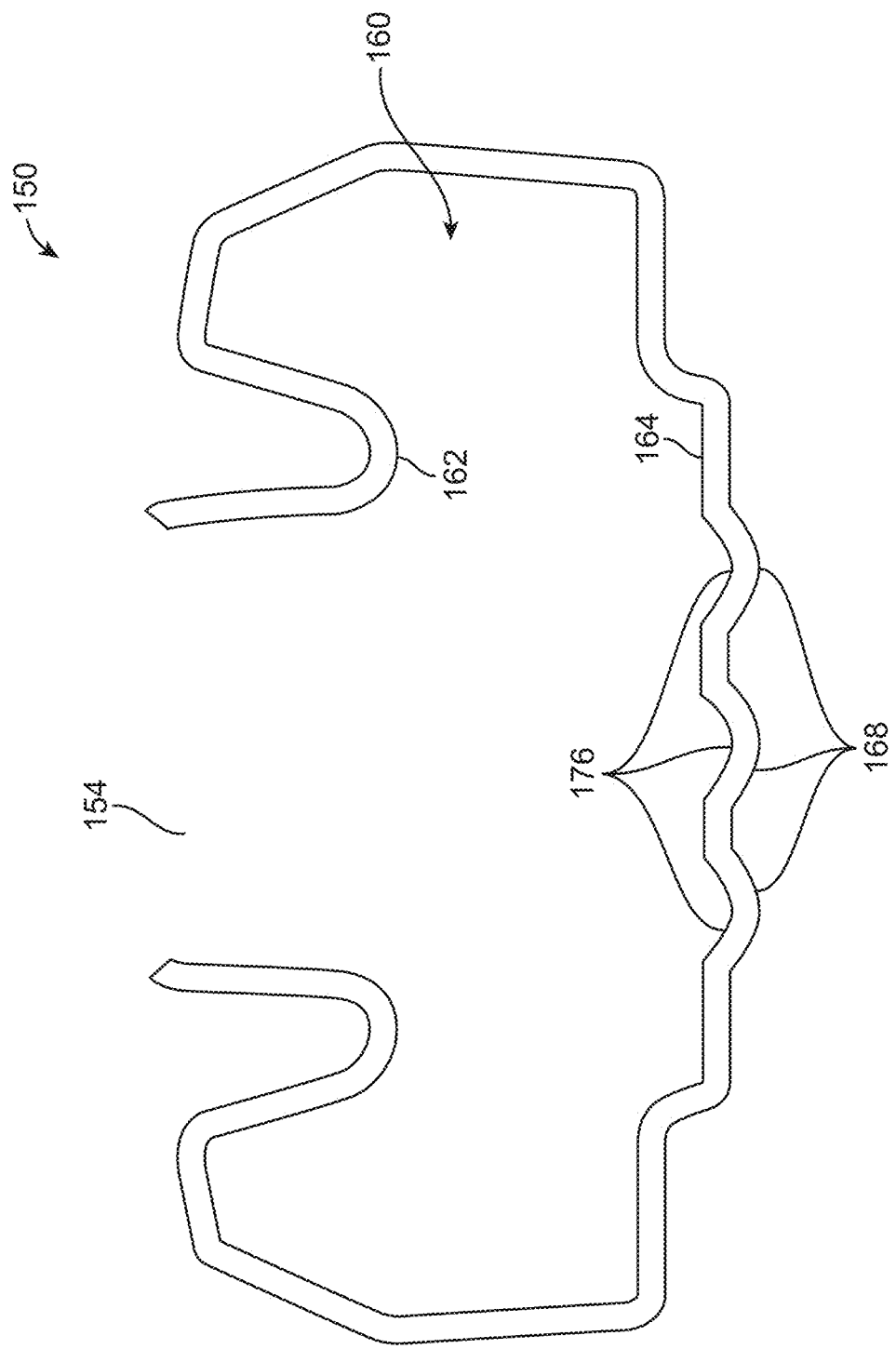
FIG. 7 is a diagrammatic rear cross-sectional view of a tank in accordance with other embodiments of the present disclosure, the tank incorporating undulations having a concave cross-sectional profile.
Figure 8:
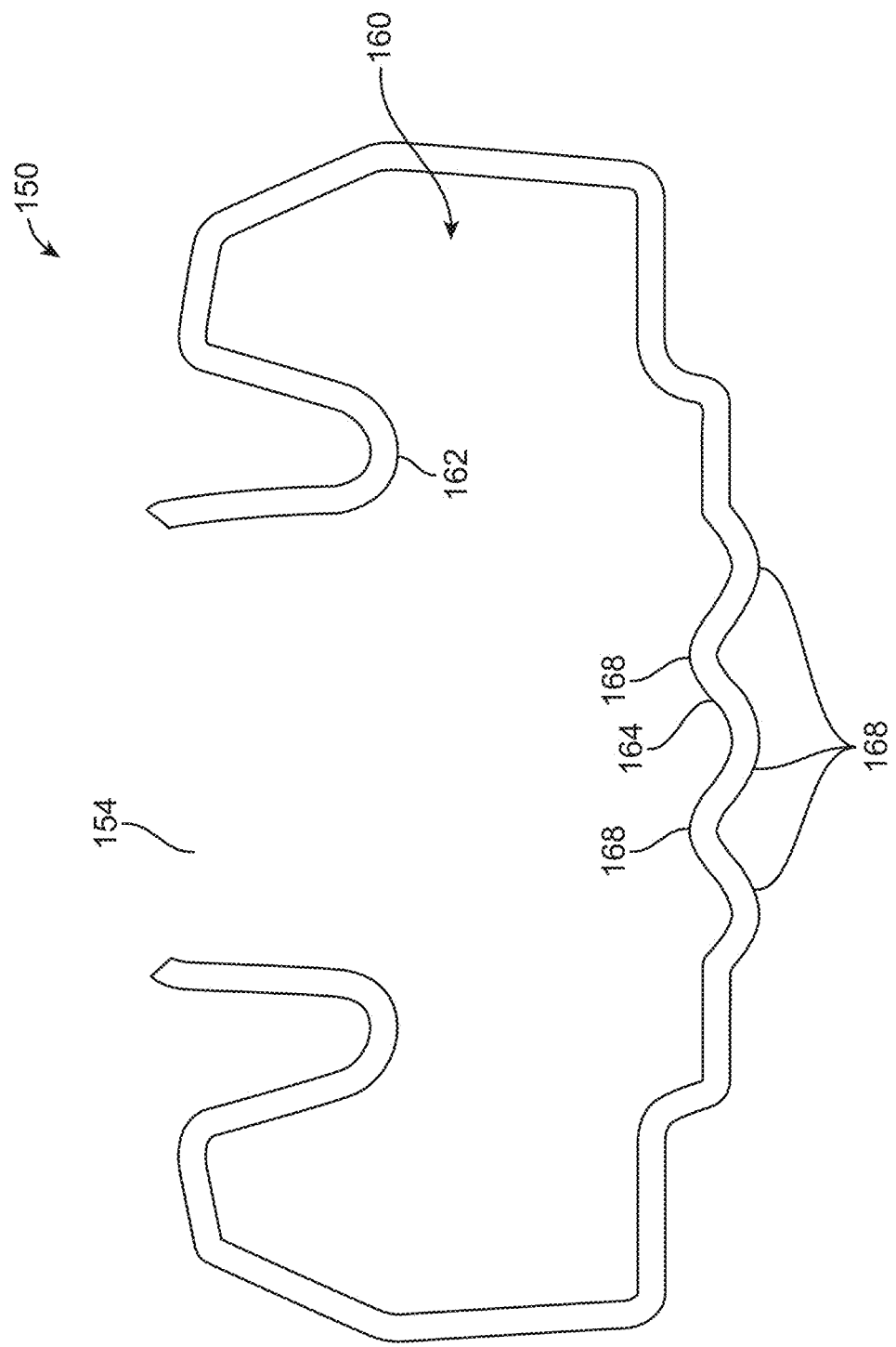
FIG. 8 is a diagrammatic rear cross-sectional view of a tank in accordance with still other embodiments of the present disclosure, the tank incorporating undulations having a serpentine or wave-like cross-sectional profile.

As is evident in FIG. 4, the undulations may present a convex surface toward the access port 154. However, other shapes may be equally effective in dispersing incoming fuel. For example, the undulations 168 may include ribs that present saw-tooth peaks 172 (when viewed in section as shown in FIG. 6) to the access port 154. Similarly, as shown in FIG. 7, the undulations 168 could take the shape of depressions (when viewed in section) that each present a concave surface 176 to the access port 154. In yet another example, the undulations 168 may be formed by a serpentine-shaped (again, when viewed in section) floor 164 as shown in FIG. 8. In still other embodiments, the undulations 168 may include one or more dimples or recesses in the lower surface 164 arranged in any suitable pattern or orientation and may take on any suitable size and/or shape (or any combination of sizes and/or shapes).

In any of the above-described alternatives, the undulations may be sized similar to the protruding ribs described above. For example, the serpentine shape shown in FIG. 8 may include at least one portion that effectively presents a concave surface to the access port 154 adjacent to at least one portion that presents a convex surface to the access port 154. A height measured from the lowest portion of the concave-facing surface to the highest portion of the convex-facing surface may again be 3-7 mm. Of course, as described above, such a configuration is exemplary only and may vary based upon other aspects of the tank and the desired fluid dispersion characteristics.

While the access port 154 may be positioned above a shallow portion of the tank, the tank may include deeper portions to maximize volume. For example, the interior volume 160 may define a first portion 160c (see FIG. 5) proximate the access port 154, and a second portion 160d spaced-apart from the access port 154. When used with the illustrated mower, the first portion 160c may extend along a top of the wheel 106 and thus be shallower than the second portion 160d, which may extend downwardly in front of the wheel 106. Such a configuration may allow acceptable volume while maintaining a relatively low overall profile above the wheel 106. Moreover, due to the impingement surfaces in accordance with embodiments described herein, the access port location may be positioned conveniently within the shallow first portion without resulting in splash back that may be otherwise associated with conventional shallow fuel tanks. This further allows positioning of the access port away from the engine (e.g., in rear location that is readily-accessible by the operator during filling).

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A grounds maintenance vehicle, comprising:
   a frame; and
   a low-profile liquid storage tank attached to the frame and defining an interior volume, the tank comprising:
      an interior upper surface defining an access port into the interior volume; and
      an interior lower surface comprising a fluid impingement portion positioned vertically below the access port, the impingement portion comprising two or more undulations formed in or on the lower surface of the tank, wherein the impingement portion defines a serpentine shape when viewed in cross section.

2. The vehicle of claim 1, wherein the two or more undulations are integrally formed with the lower surface.

3. The vehicle of claim 1, wherein each of the two or more undulations comprises an elongate rib extending along, and protruding from, the lower surface.

4. The vehicle of claim 3, wherein the ribs are parallel to one another.

5. The vehicle of claim 3, wherein the ribs each present a convex surface toward the access port.

6. The vehicle of claim 3, wherein the ribs each present a peak toward the access port.

7. The vehicle of claim 1, wherein the tank comprises roto-molded plastic.

8. The vehicle of claim 1, wherein each of the two or more undulations defines a maximum offset of 3 millimeters to 7 millimeters from adjacent portions of the lower surface.

9. The vehicle of claim 1, wherein the access port defines an external rim, and wherein a distance measured from a most distal point on the external rim orthogonal to the lower surface is 150 millimeters or less.

10. A grounds maintenance vehicle, comprising:
    a frame; and
    a low-profile liquid storage tank attached to the frame and defining an interior volume, the tank comprising:
       an interior upper surface defining an access port into the interior volume; and
       an interior lower surface comprising a fluid impingement portion positioned vertically below the access port, the impingement portion defining a serpentine shape when viewed in cross section.

11. A grounds maintenance vehicle, comprising:
    a frame; and
    a low-profile liquid storage tank attached to the frame and defining an interior volume, the tank comprising:
       an interior upper surface defining an access port into the interior volume; and
       an interior lower surface comprising a fluid impingement portion positioned vertically below the access port, the impingement portion comprising two or more undulations formed in or on the interior lower surface of the tank, wherein at least one of the two or more undulations defines: a convex cross-sectional profile a saw-tooth cross-sectional profile a concave cross-sectional profile; or part of a serpentine cross-sectional profile.

12. The vehicle of claim 11, wherein each of the two or more undulations are parallel to one another.

13. The vehicle of claim 12, wherein the two or more undulations comprise three undulations.

14. The vehicle of claim 11, wherein each of the two or more undulations defines a maximum offset of 3 millimeters to 7 millimeters from adjacent portions of the interior lower surface.

15. The vehicle of claim 11, wherein the access port defines an external rim, and wherein a distance measured from a most distal point on the external rim orthogonal to the interior lower surface is 150 millimeters or less.

* * * * *

UNITED STATES PATENT AND TRADEMARK OFFICE
CERTIFICATE OF CORRECTION

| | | |
|---|---|---|
| PATENT NO. | : 11,299,040 B2 | |
| APPLICATION NO. | : 16/295107 | |
| DATED | : April 12, 2022 | |
| INVENTOR(S) | : Nickolas T. Moore | |

It is certified that error appears in the above-identified patent and that said Letters Patent is hereby corrected as shown below:

In the Claims

Column 8, Line 42, (Claim 11, Line 13), should read -profile; a saw-tooth cross-sectional profile;-.

Signed and Sealed this
Twentieth Day of September, 2022

Katherine Kelly Vidal
*Director of the United States Patent and Trademark Office*